(12) United States Patent
Ando (10) Patent No.: US 8,413,178 B2
(45) Date of Patent: Apr. 2, 2013

(54) DISK DEVICE

(75) Inventor: Masahiro Ando, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 783 days.

(21) Appl. No.: 12/273,594

(22) Filed: Nov. 19, 2008

(65) Prior Publication Data

US 2009/0147662 A1 Jun. 11, 2009

(30) Foreign Application Priority Data

Dec. 5, 2007 (JP) ................................. 2007-314256

(51) Int. Cl.
*G11B 7/085* (2006.01)
*G11B 21/02* (2006.01)
*G11B 17/00* (2006.01)

(52) U.S. Cl. ..................................... 720/679; 369/247.1

(58) Field of Classification Search .................. 720/679, 720/682–688; 369/247.1, 263.1
See application file for complete search history.

(56) References Cited

U.S. PATENT DOCUMENTS

| 6,922,841 B2 * | 7/2005 | Lee et al. ...................... 720/677 |
| 2003/0058778 A1 * | 3/2003 | Lin ................................ 369/247 |
| 2003/0179682 A1 * | 9/2003 | Osada et al. ............. 369/112.23 |
| 2004/0205795 A1 * | 10/2004 | Choi ............................. 720/679 |
| 2004/0205797 A1 * | 10/2004 | Kobayashi ..................... 720/688 |
| 2004/0268372 A1 * | 12/2004 | Liu ................................ 720/601 |
| 2005/0034142 A1 * | 2/2005 | Park et al. ...................... 720/676 |
| 2005/0174989 A1 * | 8/2005 | Chen et al. ..................... 370/351 |
| 2005/0223397 A1 * | 10/2005 | Arase ............................. 720/601 |
| 2006/0187801 A1 * | 8/2006 | Nishidate et al. ............. 369/125 |
| 2007/0171777 A1 * | 7/2007 | Takahashi .................. 369/44.15 |

FOREIGN PATENT DOCUMENTS

| JP | 10-149640 A | | 6/1998 |
| JP | 11-66770 A | | 3/1999 |
| JP | 11066770 A | * | 3/1999 |
| JP | 2002-216441 A | | 8/2002 |
| JP | 2005-235263 A | | 9/2005 |

* cited by examiner

*Primary Examiner* — Craig A. Renner
*Assistant Examiner* — Adam B Dravininkas
(74) *Attorney, Agent, or Firm* — Global IP Counselors (57) ABSTRACT

A disk device includes a frame, an optical pickup and a shock absorbing component. The frame has a receiving component. The optical pickup is slidable with respect to the frame. The shock absorbing component is fixedly coupled to the optical pickup and arranged to selectively contact the receiving component of the frame. The shock absorbing component includes a support portion and a spring piece. The spring piece has a first end portion that is fixedly coupled to the optical pickup and a second end portion that is spaced from the support portion in an unloaded rest state and that contacts the support portion to support the spring piece at both the first and second end portions with respect to the optical pickup when the spring piece is pushed by the receiving component of the frame to a loaded state.

19 Claims, 4 Drawing Sheets

DISK DEVICE

CROSS-REFERENCE TO RELATED APPLICATIONS

This application claims priority to Japanese Patent Application No. 2007-314256 filed on Dec. 5, 2007. The entire disclosure of Japanese Patent Application No. 2007-314256 is hereby incorporated herein by reference.

BACKGROUND OF THE INVENTION

1. Field of the Invention

The present invention generally relates to a disk device. Specifically, the present invention relates to a disk device having a shock absorbing component for an optical pickup.

2. Background Information

A conventional disk device includes an optical pickup for scanning a disk recording face of a disk and a power transmission mechanism. The optical pickup includes a light emitting element, a light receiving element, an objective lens and an optical base. The light emitting element, the light receiving element and the objective lens are assembled in the optical base. The power transmission mechanism includes a screw shaft that is rotationally driven at a fixed position by a motor, and a movable unit that has teeth that mesh with the screw shaft. The movable unit is linked to the optical base of the optical pickup, constituting part of the optical pickup. The power transmission mechanism converts the rotational motion of the screw shaft into the linear motion of the movable unit, and transmits the motion to the optical pickup.

The optical base of the optical pickup has a slide bearing and a slider. The slide bearing is slidably mated to a guide shaft attached to a frame. The slider follows a countershaft that is also attached to the frame. The drive force transmitted by the power transmission mechanism causes the optical pickup to be guided by the guide shaft and the countershaft and travel a linear path in the forward and backward directions. A turntable is attached to the frame. The recording face of the disk rotating along with the turntable is optically scanned by the optical pickup.

With the conventional disk device, the normal range of travel of the optical pickup, or the range of travel of the optical pickup during normal recording or reproduction (effective travel range) falls within the range in which the teeth of the movable unit mesh with the teeth by the electrical control of the rotational direction, the number of rotations and the rotational speed of the motor. Therefore, under suitable electrical control, the optical pickup does not move outside of the effective travel range and collide with the frame.

If the disk device should be subjected to a heavy impact for some reason when the disk device is being transported or moved, such as when the device is dropped, the teeth of the movable unit moves outside of the effective travel range of the optical pickup while rotating the screw shaft, and disengage to the spiral groove in the screw shaft. As a result, the position where the two mesh deviates from the normal position, which prevents proper recording or reproduction operation.

In view of this, a protrusion is provided to one end of the movable unit, so that if the optical pickup runs outside of the effective travel range, the protrusion is received by a receiver provided on the frame, thereby preventing the runaway movement.

Meanwhile, another conventional disk reproduction device cushions the impact when a pickup that has reached the inner or outer periphery of the disk collides with a component on the chassis. The conventional disk reproduction device includes an elastic contact tab with a cantilever shape formed on a bracket. The bracket has a support tab for forcibly pushing on the end of the guide shaft and supporting the guide shaft on the chassis. The contact tab receives the pickup (see Japanese Laid-Open Patent Application No. H11-66770, for example).

Also, with another optical pickup drive mechanism, the optical pickup drive mechanism meshes with a lead screw and converts the rotational motion of the lead screw into the linear motion of the optical pickup. Furthermore, the optical pickup drive mechanism includes a means for shortening the seek time of the optical pickup (see Japanese Laid-Open Patent Application No. 2002-216441, for example).

Furthermore, another disk device includes a means for maintain a meshed state between a spiral groove of a lead screw and an engagement component of a rack that has undergone tilt adjustment (see Japanese Laid-Open Patent Application No. 2005-235263, for example).

With the conventional disk device, the protrusion received by the receiver on the frame is provided to the movable unit to prevent runaway movement of the optical pickup to outside the effective travel range as a result of impact from being dropped, etc. However, the impact when the protrusion collides with the receiver on the frame tends to affect the entire optical pickup directly, and this can adversely affect assembly precision of the optical components of the optical pickup assembled on the optical base, which prevents proper recording or reproduction operation.

In view of this, it is possible to adopt the approach used in Japanese Laid-Open Patent Application No. H11-66770, in which the elastic contact tab is provided to the bracket attached to the chassis to cushion the impact during collision of the optical pickup, which reduces the loss of initial assembly precision of the optical components assembled on the optical base.

However, with this arrangement, it is difficult to obtain an effective cushioning action if the elastic constant of the contact tab is too small. On the other hand, if the elastic constant is too large, it is difficult to absorb the impact effectively, which makes it difficult to obtain the effective cushioning action. Accordingly, there are many limitations regarding the proper setting of the elasticity of the contact tab. As a result, it is difficult to obtain an effective cushioning action with the cantilevered contact tab. Also, this approach requires extra parts, such as the contact tab and fastening screws used to attach the contact tab to the chassis. Thus, there is a corresponding increase in the number of parts, and this complicates the assembly process.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a disk device with which shock to an optical pickup is effectively absorbed.

In accordance with one aspect of the present invention, a disk device includes a frame, an optical pickup and a shock absorbing component. The frame has a receiving component. The optical pickup is slidable with respect to the frame. The shock absorbing component is fixedly coupled to the optical pickup and arranged to selectively contact the receiving component of the frame. The shock absorbing component includes a support portion and a spring piece. The spring piece has a first end portion that is fixedly coupled to the optical pickup and a second end portion that is spaced from the support portion in an unloaded rest state and that contacts the support portion to support the spring piece at both the first and second end portions with respect to the optical pickup when the spring piece is pushed by the receiving component of the frame to a loaded state.

With the disk device of the present invention, it is possible to provide a disk device with which shock to an optical pickup is effectively absorbed.

These and other objects, features, aspects and advantages of the present invention will become apparent to those skilled in the art from the following detailed descriptions, which, taken in conjunction with the annexed drawings, disclose selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention is provided for illustration only and not for the purpose of limiting the invention as defined by the appended claims and their equivalents.

Figure 1:
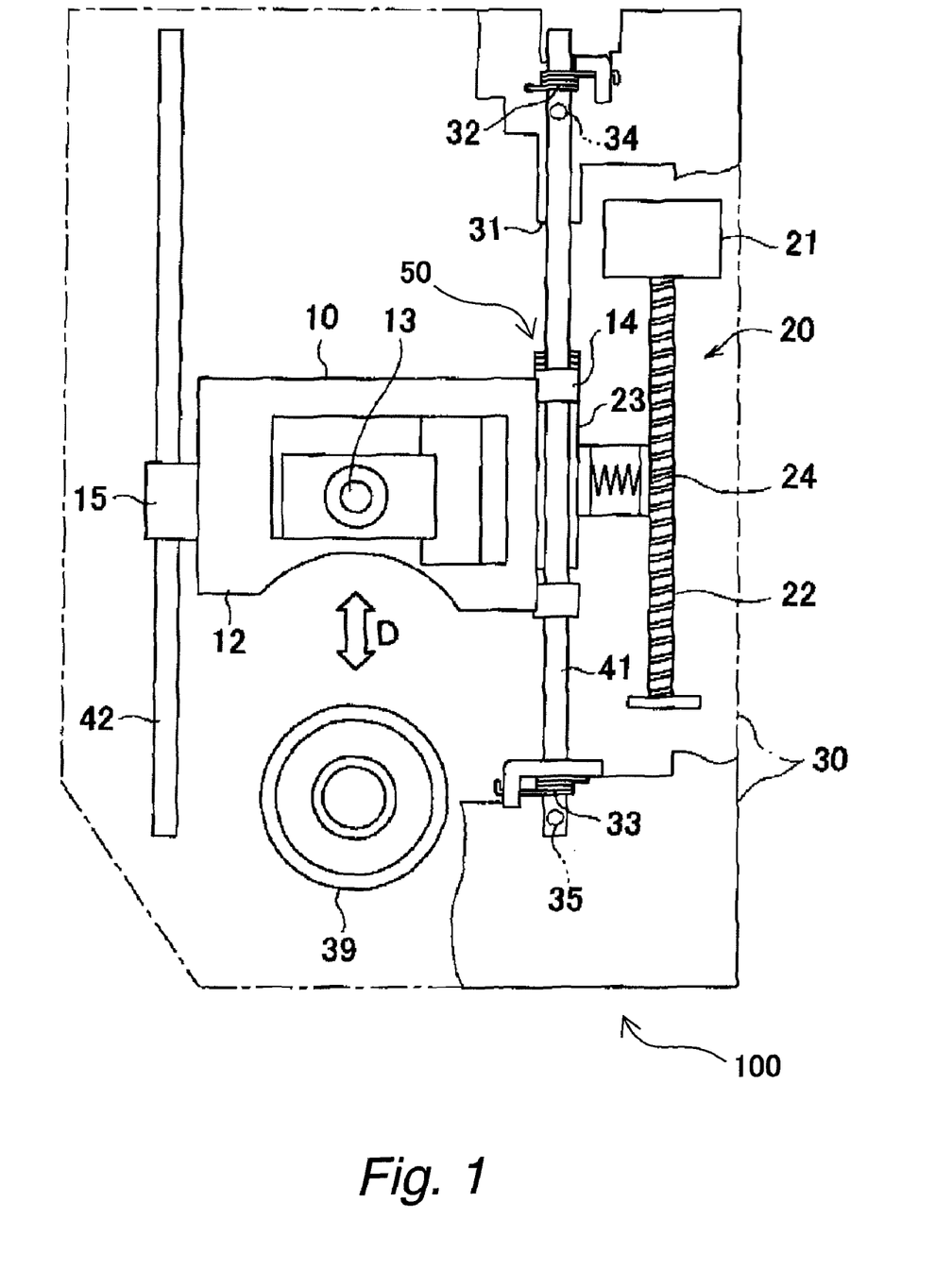
FIG. 1 is a simplified plan view of a disk device in accordance with a first embodiment of the present invention.
Figure 2:
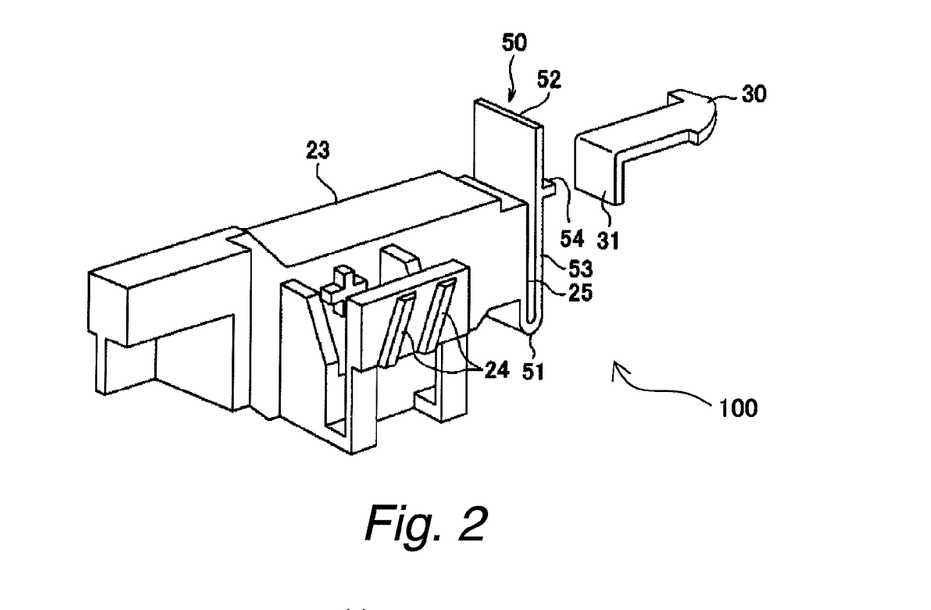
FIG. 2 is a simplified perspective view of a movable unit of the disk device illustrated in FIG. 1.

As shown in FIGS. 1 and 2, a disk device 100 includes an optical pickup 10, a power transmission mechanism 20 and a frame 30. The optical pickup 10 scans a disk recording face of a disk (not shown) mounted on a turntable 39. The optical pickup 10 is slidable with respect to the frame 30 along a radial direction of the disk. The optical pickup 10 includes a light emitting element, a light receiving element, a plurality of optical components such as an objective lens 13, and an optical base 12. The light emitting element, the light receiving element and the optical components are assembled on the optical base 12. The power transmission mechanism 20 includes a motor 21, a screw shaft 22 and a movable unit 23. The screw shaft 22 is rotationally driven at a fixed position by the motor 21. The movable unit 23 has teeth 24 that mesh with the screw shaft 22. The movable unit 23 is fixedly coupled to the optical base 12 of the optical pickup 10 to form a part of the optical pickup 10. The power transmission mechanism 20 converts the rotational motion of the screw shaft 22 into the linear motion of the movable unit 23, and transmits the motion (e.g., drive force) to the optical pickup 10.

The optical base 12 of the optical pickup 10 includes a slide bearing 14 and a slider 15. The slide bearing 14 is slidably mated to a guide shaft 41 that is fixedly attached to the frame 30. The slider 15 is guided along a countershaft 42 that is fixedly attached to the frame 30. The drive force transmitted by the power transmission mechanism 20 causes the optical pickup 10 to be guided along the guide shaft 41 and the countershaft 42 and travel a linear path in forward and backward directions along the radial direction of the disk as shown by an arrow D in FIG. 1. The turntable 39 is rotatably attached to the frame 30. The recording face of the disk rotating along with this turntable 39 is optically scanned by the optical pickup 10.

The disk device 100 further includes torsion springs 32 and 33 that bias the guide shaft 41 to the frame 30. The torsion springs 32 and 33 are attached to the both end portions of the guide shaft 41. Furthermore, the disk device 100 includes adjusting screws 34 and 35 that are threaded into the frame 30. The adjusting screws 34 and 35 support the both end portions of the guide shaft 41 from below to resist biasing force of the torsion springs 32 and 33. The levelness of the guide shaft 41 is adjusted by threading in or out the adjusting screws 34 and 35.

As shown in FIG. 2, the movable unit 23 also includes a spring piece 50. The spring piece 50 is formed integrally from plastic. The spring piece 50 is located at one end portion of the movable unit 23 that positions near an outer end in a travel direction of the optical pickup 10. The travel direction of the optical pickup 10 extends along the radial direction of the disk mounted on the turntable 39. The movable unit 23 is integrally formed as a one-piece, unitary member. The movable unit 23 is molded from plastic. The spring piece 50 has a proximal end component (e.g., first end portion) 51, a distal end component (e.g., second end portion) 52, a riser tab (e.g., rising tab) 53 and a striking component 54. The proximal end component 51 is extended from a one end face 25 of the movable unit 23 and is located contiguous with the movable unit 23. The proximal end component 51 is formed in a U shape. The riser tab 53 extends parallel to the one end face 25 of the movable unit 23 from the proximal end component 51. The distal end component 52 is located at a distal end of the riser tab 53. The distal end component 52 is formed as a free end when the riser tab 53 is formed in a cantilever shape. Specifically, the distal end component 52 is spaced from a spring piece support 55 of the optical pickup 10 and is cantilevered with respect to a spring piece support 55 of the optical pickup 10 in an unloaded rest state (e.g., unbiased rest state) of the spring piece 50 as shown in FIG. 2. The spring piece 50 is formed in the same thickness and width over its entire length. When the riser tab 53 is supported on only the proximal end component 51 in the cantilever shape as shown in FIG. 2, the spring piece 50 bends back and forth with the area near the proximal end component 51 as the fulcrum. Therefore, with the spring piece 50 with the cantilever shape, the bending deformation of the spring piece 50 is absorbed by the springiness of the proximal end component 51. In other words, the proximal end component 51 has elasticity to absorb impact to the optical pickup 10 received from the frame 30. The striking component 54 is formed in the middle portion of the riser tab 53 between the proximal end component 51 and the distal end component 52 in the longitudinal direction of the riser tab 53. The striking component 54 is a protrusion protruding towards a receiver (e.g., a receiving component) 31 integrally formed on the frame 30. The striking component 54 is provided in a state of sticking out with respect to the riser tab 53.

Figure 3:
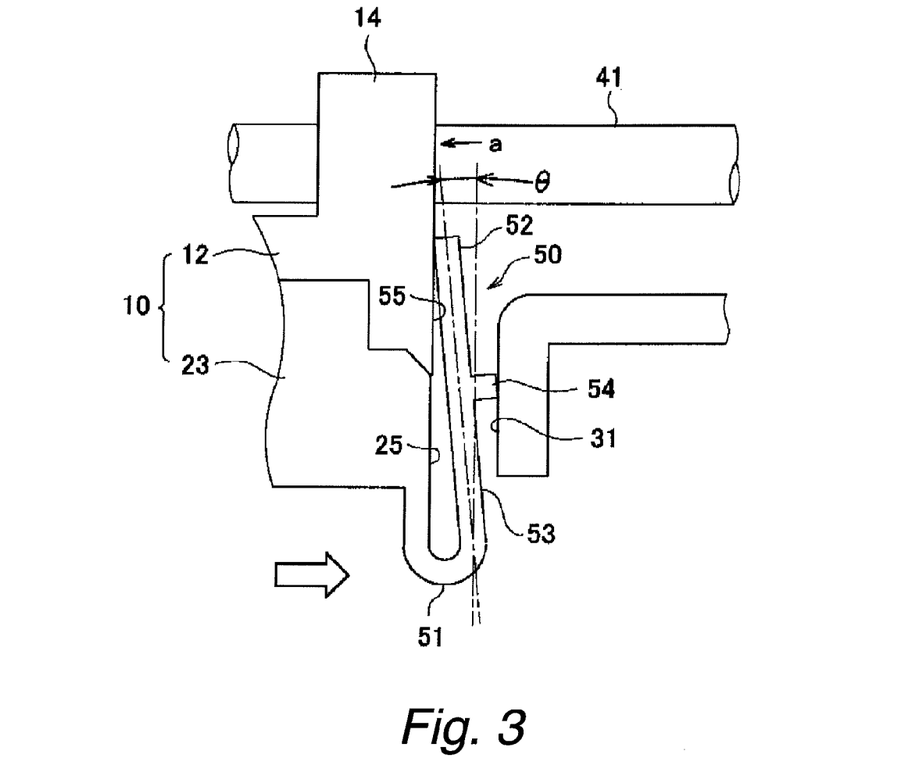
FIG. 3 is a side view of a spring piece of the movable unit illustrating a first absorbing state of the spring piece.
Figure 4:
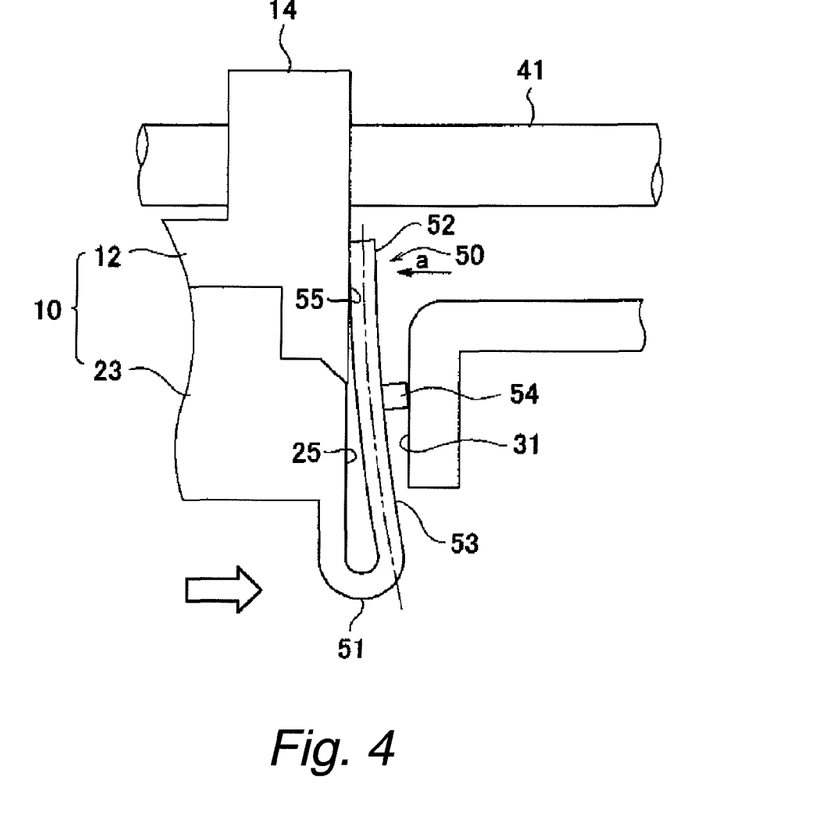
FIG. 4 is a side view of the movable unit illustrating a second absorbing state of the spring piece.

Meanwhile, as shown in FIGS. 2-4, the optical base 12 of the optical pickup 10 further includes the spring piece support (e.g., support portion) 55 at an end face of the optical base 12. The optical base 12 is integrally formed as a one-piece, unitary member. The spring piece support 55 is located a specific gap away from the distal end component 52 of the spring piece 50 with the cantilever shape. Therefore, when the spring piece 50 is pushed by the receiver 31 of the frame 30 to a loaded state of the spring piece 50 and is bent towards the optical pickup 10, the distal end component 52 of the spring piece 50 strikes the spring piece support 55. As a result, the spring piece 50 changes from the cantilever shape to a double supported shape, in which the riser tab 53 of the spring piece 50 is supported at both longitudinal ends with respect to the optical pickup 10. Specifically, in the double supported shape, the riser tab 53 is supported at both the proximal end component 51 and the distal end component 52. The spring piece support 55 and the spring piece 50 forms a shock absorbing component fixedly coupled to the optical pickup 10 between the optical pickup 10 and the receiver 31 of the frame 30.

When the optical pickup 10 is in an initial position, that is, when the optical pickup 10 is located at an initial position near the turntable 39 shown in FIG. 1, if the disk device 100 is accidentally dropped, the teeth 24 of the movable unit 23 moves while still meshed with the screw shaft 22 and while rotating the screw shaft 22. Then, the optical pickup 10 moves outward with respect to the turntable 39 and runs outside of the effective travel range. As a result, the striking component 54 of the spring piece 50 provided to the movable unit 23 collides with the receiver 31 on the frame 30. When the striking component 54 of the spring piece 50 hits the receiver 31 on the frame 30, depending on the magnitude of the impact, the distal end component 52 of the spring piece 50 is displaced towards the spring piece support 55 as indicated by the arrow "a" in FIGS. 3 and 4. Then, the distal end component 52 strikes the spring piece support 55 of the optical pickup 10. As a result, the spring piece 50 is supported at both the proximal end component 51 and the distal end component 52 with respect to the optical pickup 10. Then, the spring piece 50 changes from the cantilever shape shown in FIG. 3 to the double supported shape shown in FIG. 4. In FIG. 3, the symbol θ indicates the displacement angle of the distal end component 52 needed to bend the spring piece 50 and change the spring piece 50 from the cantilever shape to the double supported shape. At a first absorbing state up until the spring piece 50 changes from the cantilever shape to the double supported shape, the impact is absorbed by the bending deformation of the proximal end component 51 of the spring piece 50. This lightens the impact to which the optical pickup 10 is subjected.

At a second absorbing state after the spring piece 50 has changed from the cantilever shape to the double supported shape, that is, at the second absorbing state following the first absorbing state, the spring piece 50 is in the double supported shape. The impact load is concentrated at the place where the striking component 54 is formed, which is the middle position of the riser tab 53. Accordingly, as shown by the one-dot chain line in FIG. 4, the place where the striking component 54 is formed is pushed so that the riser tab 53 bends in an arc shape, and the impact is absorbed. Therefore, the impact to which the optical pickup 10 is subjected is lightened by being absorbed by the bending deformation of the spring piece 50 in the double supported shape.

The impact to which the optical pickup 10 is subjected is thus absorbed by the bending deformation of the spring piece 50. Furthermore, the impact is absorbed by the spring piece 50 in the cantilever shape in the first absorbing state, and is absorbed by the spring piece 50 in the double supported shape in the second absorbing state. Thus, the speed of the optical pickup 10 that moves outward is slowed slightly in the first absorbing state, and the slowed optical pickup 10 stops in the second absorbing state. Therefore, a decelerating action is smoothly exhibited until the optical pickup 10 stops, and the impact acting on the optical pickup 10 during this time is efficiently attenuated. Accordingly, with the disk device 100, the impact to which the optical pickup is subjected is effectively cushioned through a two-stage change in the elastic constant of the spring piece 50. As a result, this effectively prevents the position where the teeth 24 of the movable unit 23 mesh with the screw shaft 22 (see FIG. 1) from deviating from the normal position, and prevents a loss of the initial assembly precision of optical components attached to the optical base, etc.

Figure 5:
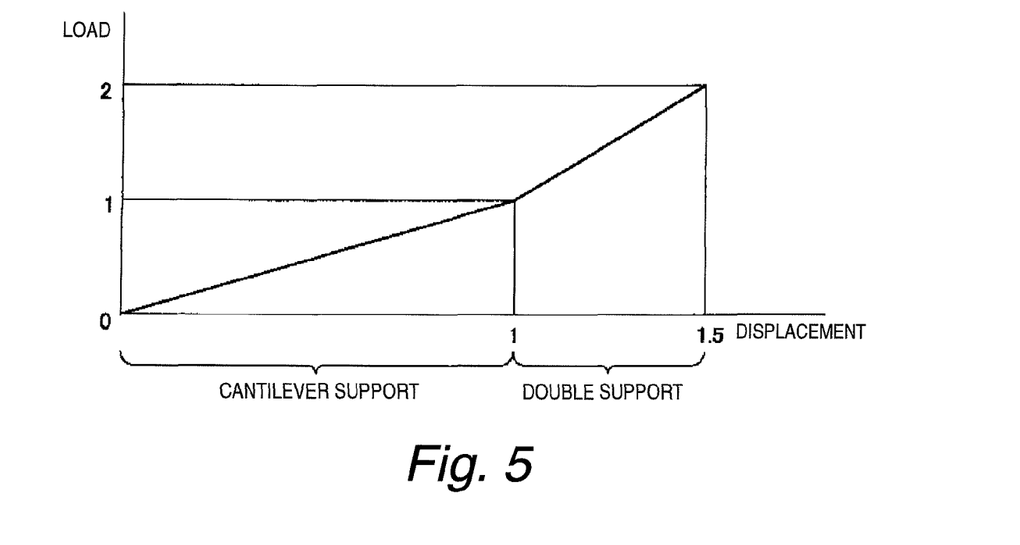
FIG. 5 is a graph of a relationship between load and displacement of the spring piece.

FIG. 5 is a graph of the relationship between load and displacement of the spring piece 50 in the cantilever shape and the double supported shape. In FIG. 5, the numeral "1" indicates the amount of displacement of the spring piece 50 when the spring piece 50 changes from the cantilever shape to the double supported shape. When the load imparted to the spring piece 50 to change the spring piece 50 from the cantilever shape to the double supported shape is indicated by the numeral "1," twice the load need to be imparted to the spring piece 50 in order to change the displacement of the spring piece 50 to 1.5 times. Thus, the impact to which the optical pickup 10 is subjected is effectively cushioned through the two-stage change in the elastic constant of the spring piece 50. Furthermore, mis-adjustment of the optical components installed in the optical pickup 10 is also kept to a minimum, and recording and reproduction can be carried out, even when a load of 80 G is imparted by impact. In particular, the optical components are prevented from falling out by the impact.

Also, since the spring piece 50 is formed from plastic integrally with the movable unit 23, providing the spring piece 50 does not increase the number of components. Therefore, there is no complication of the assembly process that would be caused by an increase in the number of parts. Furthermore, since the constitution is such that the spring piece 50 with the cantilever shape undergoes bending deformation with the area near the proximal end component 51 as the fulcrum, the spring piece 50 will readily bend even if the riser tab 53 of the spring piece 50 is shortened in length. Accordingly, when the spring piece 50 is molded from plastic integrally with the movable unit 23, an advantage is that this molding can be performed more easily than when employing a constitution in which bending is facilitated by increasing the length of the spring piece 50.

The disk device 100 is designed so that when the disk device 100 is dropped or otherwise subjected to an impact force so that the optical pickup 10 moves too fast, it is possible to minimize the malfunction or mis-timing of the optical pickup 10 caused by the movement of the optical pickup 10.

Specifically, the impact of falling, etc., is cushioned by using spring force of the spring piece 50 to catch the optical pickup 10 that has run out of the effective travel range. This effectively prevents the position where the teeth 24 of the movable unit 23 mesh with the screw shaft 22 from deviating from the normal position, and prevents a loss of the initial assembly precision of optical components attached to the optical base 12. Thus, it is possible to provide a disk device with which not only will there be no increase in the number of parts or the attendant complication of the assembly process, but with which the strength of the initial elasticity of an impact-cushioning spring member can be easily set by providing a means for varying in two stages the elastic constant during impact absorption by the spring piece 50.

With the disk device 100, the striking component 54, which is caught by the receiver 31 provided to the frame 30 when the optical pickup 10 runs out of the effective travel range and halts the uncontrolled movement of the optical pickup 10, is provided to the spring piece 50 that has the cantilevered shape and extends from the movable unit 23. Furthermore, the optical pickup 10 is provided with the spring piece support 55 that strikes the distal end component 52 of the spring piece 50 and changes the form of the spring piece 50 from the cantilevered shape to the double supported shape when the striking component 54 is caught by the receiver 31 and the spring piece 50 undergoes bending deformation.

With the disk device 100, at the first absorbing state when the optical pickup 10 has been caught by the striking component 54 of the spring piece 50, the spring piece 50 retains the cantilever shape while undergoing bending deformation. If the load produced by impact is small, the impact is cushioned by the bending deformation of the spring piece 50 with the cantilever shape. At the second absorbing state after the spring piece 50 has undergone bending deformation, the distal end component 52 of the spring piece 50 strikes the spring piece support 55 of the optical pickup 10 and changes from the cantilever shape to the double supported shape. Accordingly, the elastic constant of the spring piece 50 changes from a small value to a large value. Therefore, when the load produced by impact is large, part of the load produced by impact is absorbed by the bending deformation of the spring piece 50 with the cantilever shape, while the rest of the load is cushioned by the bending deformation of the spring piece 50 with the double supported shape. Therefore, the impact is effectively cushioned overall. This means that even if the elasticity of the spring piece 50 with the cantilever shape is weakened, the elasticity becomes stronger at the point when the spring piece 50 changes from the cantilever shape to the double supported shape. Thus, it is easy to set the strength of the initial elasticity of the spring piece 50 to a level at which an effective cushioning action is obtained. Also, since the spring piece 50 extends from the movable unit 23, which is a plastic molding, of the power transmission mechanism 20, the spring piece 50 can be molded integrally from plastic along with the movable unit 23. Thus, there is no increase in the number of parts as would be the case if a spring piece were added on. Therefore, there is no complication of the assembly process that would be caused by an increase in the number of parts.

With the disk device 100, the spring piece 50 with the cantilever shape has the striking component 54 at the middle position between the proximal end component 51 that is located at a place that is contiguous with the movable unit 23, and the distal end component 52. After the spring piece 50 has changed from the cantilever shape to the double supported shape, the spring piece 50 bends in an arc shape between the proximal end component 51 and the distal end component 52, and this deformation exhibits a cushioning action.

With the disk device 100, the proximal end component 51 of the spring piece 50 with the cantilever shape is formed in a U shape that extends from the movable unit 23, which gives the proximal end component 51 springiness to absorb bending deformation of the cantilevered state of the spring piece 50. Since the spring piece 50 with the cantilever shape undergoes bending deformation with the area near the proximal end component 51 as the fulcrum, the elastic constant of the spring piece 50 can be kept low even if the spring piece 50 is shortened in length. Accordingly, an advantage is that even if the spring piece 50 is made shorter in order to make it easier to mold the spring piece 50 integrally with the movable unit 23, it is easy to form the spring piece 50 that is readily deformable at the first absorbing state.

With the disk device 100, the striking component 54 is a protrusion that is provided to the spring piece 50 and sticks out towards the receiver 31. The force applied to the spring piece 50 at the second absorbing state after the spring piece 50 has changed from the cantilever shape to the double supported shape concentrates at the place where the striking component 54 is formed. Thus, a favorable cushioning and absorbing action can be exhibited by the spring piece 50 with the double supported shape bends in an arc.

With the disk device 100, the striking component 54 collides with the receiver 31 when the optical pickup 10 moves too fast in a direction moving away from the initial position near the turntable 39. With the disk device 100, the initial position of the optical pickup 10 is fixed near the turntable 39. If the disk device 100 is accidentally dropped, then the optical pickup 10 moves away from the turntable 39. Therefore, if a cushioning action is exhibited at such times, then the spring force of the spring piece 50 can be utilized to cushion the impact to the optical pickup 10 that has run outside of the effective travel range due to impact from being dropped, etc.

With the disk device 100, the impact that is imparted to the optical pickup 10 is effectively cushioned through the two-stage change in the elastic constant of the spring piece 50, without entailing a more complicated assembly process involving more components. Accordingly, this effectively prevents the position where the teeth 24 of the movable unit 23 mesh with the screw shaft 22 from deviating from the normal position, and prevents a loss of the initial assembly precision of optical components attached to the optical base 12. Also, even if the elastic constant of the spring piece 50 with the cantilever shape is set small, since a large elastic constant is exhibited when the spring piece 50 changes from the cantilevered state to the double supported shape, it is easy to set the strength of the initial elasticity of the spring piece 50.

Second Embodiment

Figure 6:
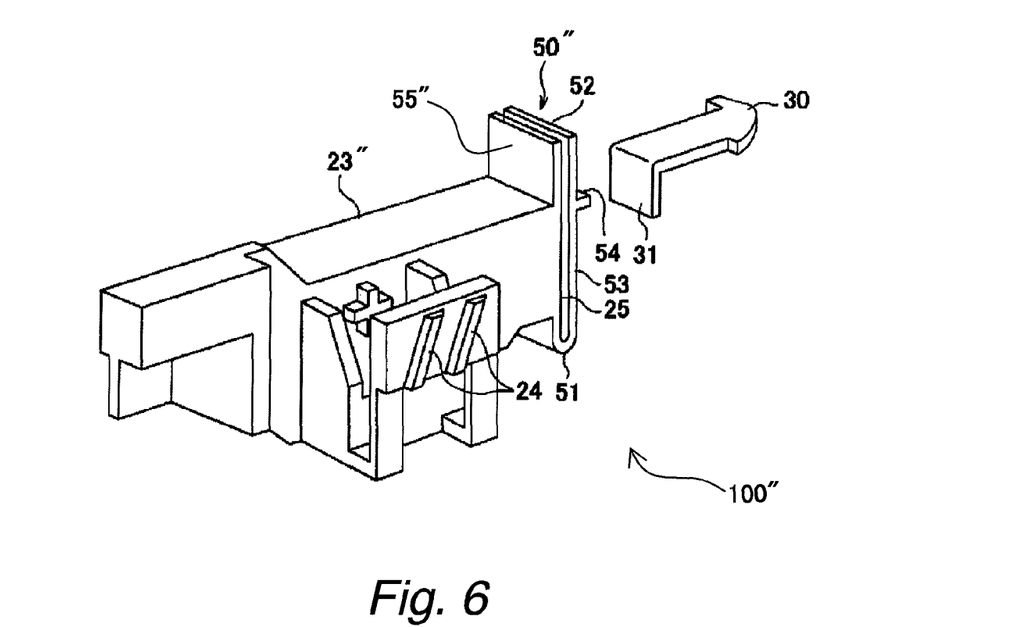
FIG. 6 is a simplified perspective view of a movable unit of a disk device in accordance with a second embodiment of the present invention.
Figure 7:
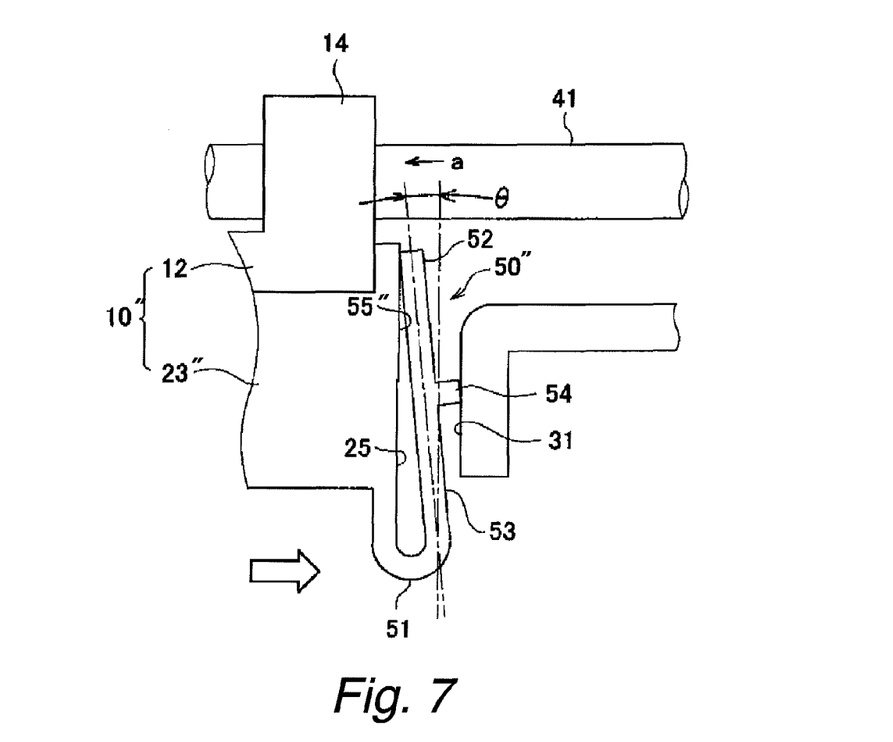
FIG. 7 is a side view of a spring piece of the movable unit illustrating a first absorbing state of the spring piece.

Referring now to FIGS. 6 and 7, a disk device 100" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

With the disk device 100 in accordance with the first embodiment, the optical base 12 of the optical pickup 10 includes the spring piece support 55. With the disk device 100" in accordance with the second embodiment, the spring piece support 55" is integrally formed with the movable unit 23" as shown in FIGS. 6 and 7. Specifically, the movable unit 23" includes the spring piece support 55" facing with the distal end component 52 and the riser tab 53 of the movable unit 23" in the radial direction of the disk. The movable unit 23" is integrally formed as a one-piece, unitary member. Specifically, the movable unit 23" is molded from plastic. The spring piece support 55" extends upward from an upper face of the movable unit 23" in parallel to the riser tab 53. When the optical pickup 10" moves towards the receiver 31 of the frame 30 so that the striking component 54 hits the receiver 31, the spring piece 50″ of the movable unit 23″ is bent. Then, the distal end component 52 hits the spring piece support 55″ so that the spring piece 50 changes from the cantilever shape to the double supported shape.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A disk device comprising:
a frame having a receiving component;
an optical pickup slidable along a guide shall that extends relative to the receiving component; and
a shock absorbing component disposed on the optical pickup, the shock absorbing component being arranged to selectively contact with the receiving component of the frame, the shock absorbing component including
a U-shaped portion,
an extension portion having a proximal end portion that extends from one end of the U-shaped portion, distal end portion that is located on an opposite end of the extension portion relative to the proximal end portion and a middle portion that is disposed between the proximal end portion and the distal end portion along the extension portion, the distal end portion having a contact part that is arranged to contact with a support portion of one of the optical pickup and the shock absorbing component in a first direction of the disk device while the shock absorbing component is in a loaded state, the contact part being spaced apart from the support portion in the first direction while the shock absorbing component is in an unloaded rest state, and
a striking component disposed on the middle portion of the extension portion at a location spaced apart from the contact part along the extension portion,
the extension portion being deflected at the middle portion between the proximal end portion and the distal end portion upon a pushing force acting on the striking component while the contact part of the distal end of the extension portion contacts with the support portion.

2. The disk device according to claim 1, further comprising a power transmission mechanism configured to transmit drive force to the optical pickup, the power transmission mechanism including
a screw shaft rotatably attached to the frame, and
a movable unit fixedly coupled to the optical pickup, and having teeth that mesh with the screw shaft.

3. The disk device according to claim 2, wherein the U-shaped portion is fixedly coupled to the movable unit.

4. The disk device according to claim 3, wherein
the U-shaped portion extends from the movable unit, the U-shaped portion having elasticity to absorb impact to the optical pickup received from the receiving component of the frame.

5. The disk device according to claim 2, wherein
the shock absorbing component is integrally formed with the movable unit as a one-piece, unitary member.

6. The disk device according to claim 5, wherein
the support portion is integrally formed with the movable unit as a one-piece, unitary member.

7. The disk device according to claim 1, wherein
the extension portion of the shock absorbing component further includes a rising tab.

8. The disk device according to claim 7, wherein
the striking component contacts with the receiving component of the frame when the optical pickup relatively moves towards the receiving component of the frame.

9. The disk device according to claim 8, wherein
the extension portion is supported at only one end with respect to the optical pickup unless the distal end of the extension portion contacts with the support portion.

10. The disk device according to claim 7, wherein
the optical pickup is configured to scan a disk recording face of an optical disk along a radial direction of the optical disk.

11. The disk device according to claim 10, wherein
the striking component contacts with the receiving component of the frame when the optical pickup moves outward in the radial direction of the optical disk.

12. The disk device according to claim 11, wherein
the striking component contacts with the receiving component of the frame when the optical pickup moves outward in the radial direction of the optical disk from an initial position located adjacent to a turntable that rotates the optical disk.

13. The disk device according to claim 1, wherein
the optical pickup is configured to scan a disk recording face of an optical disk along a radial direction of the optical disk.

14. The disk device according to claim 1, wherein
the optical pickup further includes an optical base and an optical component attached to the optical base,
the support portion is formed on the optical base.

15. The disk device according to claim 1, wherein
the extension portion of the shock absorbing component is cantilevered with respect to the support portion in the unloaded rest state.

16. The disk device according to claim 1, wherein
the receiving component of the frame includes a bent portion that is bent at an angle relative to the frame.

17. The disc device according to claim 1, wherein
the striking component is arranged to selectively contact with the receiving component of the frame.

18. The disc device according to claim 17, wherein
the striking component protrudes towards the receiving component of the frame relative to the extension portion.

19. A disk device comprising:

a frame having a receiving component;

an optical pickup slidable in a sliding direction of the optical pickup with respect to the frame; and a shock absorbing component fixedly coupled to the optical pickup and arranged to selectively contact with the receiving component of the frame, and the shock absorbing component including a support portion, and a spring piece having first and second ends and a middle portion that is disposed between the first and second ends along the spring piece, the first end being fixedly coupled to the optical pickup, the second end being spaced from the support portion in the sliding direction of the optical pickup in an unloaded rest state of the spring piece, the second end including a contact part that contacts with the support portion to support the spring piece at both the first and second ends with respect to the optical pickup such that an elastic constant of the spring piece increases by deflecting the middle portion between the first and second ends while the spring piece is pushed towards the support portion in the sliding direction of the optical pickup by the receiving component of the frame to a loaded state of the spring piece, the spring piece further including a striking component that is disposed on the middle portion of the spring piece at a location spaced apart from the contact part along the spring piece, the striking component protruding towards the receiving component of the frame from the middle portion of the spring piece between the first and second ends of the spring piece, the striking component being spaced from the receiving component of the frame during the unloaded rest state of the spring piece, the striking component contacting with the receiving component of the frame during the loaded state of the spring piece.

* * * * *